United States Patent Office 2,898,221
Patented Aug. 4, 1959

2,898,221

CONCRETE OF IMPROVED STRENGTH

Barber C. Carlson, Midland, Mich., assignor to Dow Corning Corporation, Midland, Mich., a corporation of Michigan No Drawing. Application May 6, 1957
Serial No. 657,048

4 Claims. (Cl. 106—90)

This invention relates to concrete of improved strength containing alkali metal siliconate salts.

It has long been known that the application of alkali metal siliconate salts to the surface of masonry and concrete render these surfaces water repellent. However, it has not been suggested that the use of alkali metal salts of siliconates in amount below that which produces appreciable water repellency would be of any value. Applicant has found most unexpectedly that the compressive strength of concrete is improved when the alkali metal salts of monoorgano siliconates are admixed therewith in the amounts specified below.

It is the object of this invention to provide structural concrete having improved compressive strength.

This invention relates to concrete which contains admixed therewith from .05 to 1% by weight based on the weight of the Portland cement in the concrete of an alkali metal salt of a monoorgano siliconate in which the organic radicals are aliphatic hydrocarbon radicals of less than 4 carbon atoms.

The products of this invention are prepared by merely mixing the alkali metal salt (preferably in amount of from .05 to .7% by weight based on the weight of the Portland cement) with the concrete and then allowing the concrete to set. The mixing may be done at any stage of the preparation of the concrete. For example, a solution of the alkali metal salt can be added along with the water to a standard concrete mix. Alternatively, the solid alkali metal salts can be thoroughly mixed with Portland cement to produce a dry mix. This dry mix can then be used along with aggregate and water to prepare the concrete.

The alkali metal siliconate salts which are operative in this invention include any lithium, sodium, potassium or caesium salt of monomethyl siliconate, monoethyl siliconate, monopropyl siliconate, monovinyl siliconate or monoallyl siliconate. For the purpose of this invention these salts can contain an average of from less than 1 to 3 inclusive alkali metal atoms per silicon atom. Preferably the salts contain an average of from 1 to 2 alkali metal atoms per silicon. These salts are well-known commercial materials and may be prepared by any of the methods commonly known in the art. If desired, two or more salts can be employed in any one concrete mix.

The term "concrete" as employed herein has reference to any structural material which is based upon Portland cement as the cementing material and which contains a siliceous aggregate. The aggregate can be sand, gravel or other solid siliceous materials which are normally employed in concrete. The concrete of this invention can also contain any of the additives which are normally added to concrete in order to improve setting characteristics, or to give air entrainment or to prevent freezing of the concrete in cold weather.

The concrete of this invention can be employed for any structural use and can be reinforced and/or prestressed. The setting time of the concrete is increased by adding the salts of this invention so that this should be taken into consideration when a fast setting time is required.

The following examples are illustrative only and should not be construed as limiting the invention which is properly set forth in the appended claims.

Example 1

The concrete employed in this example was prepared by mixing 600 parts by weight Ottawa sand, 150 parts by weight Portland cement and 100 parts by weight water. The sodium salt of monomethyl siliconate containing about 1 sodium atom per silicon ($CH_3SiOONa$) was added to the mix along with the water in the proportions shown below. The concrete was then allowed to set and the initial and final set times were noted. The samples were aged under 100% relative humidity and the compressive strengths were determined after 2, 7 and 28 days. The water absorption was determined by drying the 7 day samples and then immersing in water for 24 hours. The percent by weight of water absorbed was determined.

| Percent by weight siliconate salt based on the weight of Portland cement | Time of set in min. | | Compressive strength in p.s.i. | | | Percent increase after 28 days | Percent water absorption |
|---|---|---|---|---|---|---|---|
| | Initial | Final | 2 days | 7 days | 28 days | | |
| None | 237 | 381 | 715 | 1,360 | 2,042 | -------- | 8.73 |
| .1 | 497 | 705 | 671 | 1,998 | 2,846 | 41 | 7.95 |
| .2 | 640 | 872 | 1,184 | 2,260 | 3,608 | 76 | 7.70 |
| .4 | 598 | 806 | -------- | 2,693 | 3,837 | 87 | 7.49 |

Example 2

Improved compressive strength is obtained when .2% by weight based on the weight of the Portland cement of the following siliconate salts are employed in the procedure of Example 1:

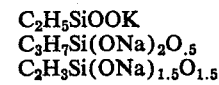

$C_2H_5SiOOK$
$C_3H_7Si(ONa)_2O_{.5}$
$C_2H_3Si(ONa)_{1.5}O_{1.5}$

That which is claimed is:

1. A method which comprises incorporating in a concrete mix from .05 to 0.7% by weight based on the weight of the Portland cement in the concrete of an alkali metal salt of a monoorgano siliconate in which the organic group is a lower aliphatic hydrocarbon radical of less than 4 carbon atoms whereby a structural concrete of improved compressive strength is produced.

2. The method in accordance with claim 1 wherein the siliconate salt is a sodium salt of monomethyl siliconate.

3. Structural concrete having improved compressive strength having admixed therewith from .05 to .7% by weight based on the weight of the Portland cement in the concrete of an alkali metal salt of a monoorgano siliconate in which the organic radical is an aliphatic hydrocarbon radical of less than 4 carbon atoms.

4. Structural concrete in accordance with claim 3 in which the siliconate salt is a sodium salt of monomethyl siliconate.

References Cited in the file of this patent

UNITED STATES PATENTS

| 2,507,200 | Elliott et al. | May 9, 1950 |
| 2,711,967 | Tomarkin | June 28, 1955 |
| 2,791,511 | Lipkind et al. | May 7, 1957 |

FOREIGN PATENTS

| 701,668 | Great Britain | Dec. 30, 1953 |

UNITED STATES PATENT OFFICE
CERTIFICATE OF CORRECTION

Patent No. 2,898,221                          August 4, 1951

Barber C. Carlson

It is hereby certified that error appears in the above numbered patent requiring correction and that the said Letters Patent should read as corrected below.

Column 2, line 42, for the formula "$C_2H_3Si(ONa)_{1.5}O_{1.5}$' read -- $C_2H_3Si(ONa)_{1.5}O_{.75}$ --.

Signed and sealed this 20th day of November 1962.

(SEAL)
Attest:

ERNEST W. SWIDER
Attesting Officer

DAVID L. LADD
Commissioner of Patents